United States Patent [19]
Fujii et al.

[11] Patent Number: 5,711,394
[45] Date of Patent: Jan. 27, 1998

[54] POWER STEERING APPARATUS WITH MOTOR DRIVEN PUMP

[75] Inventors: Tadaaki Fujii; Toshiro Yoda, both of Saitama-ken, Japan

[73] Assignee: Jidosha Kiki Co., Ltd., Tokyo, Japan

[21] Appl. No.: 661,715

[22] Filed: Jun. 11, 1996

[30] Foreign Application Priority Data

Jun. 19, 1995 [JP] Japan ................................ 7-151477

[51] Int. Cl.$^6$ ................................................. B62D 5/09
[52] U.S. Cl. ................................................. 180/422; 180/423
[58] Field of Search .......................... 180/148, 149, 180/151, 417, 421, 422, 423, 428, 443, 446; 137/625.65

[56] References Cited

U.S. PATENT DOCUMENTS

| | | | |
|---|---|---|---|
| 558,177 | 9/1896 | Inaguma et al. | 180/422 |
| 4,570,736 | 2/1986 | Waldorf | 180/423 |
| 5,367,235 | 11/1994 | Fukudome | 180/423 |
| 5,659,473 | 8/1997 | Noro et al. | 180/422 |

FOREIGN PATENT DOCUMENTS 56-67391  7/1981  Japan.

*Primary Examiner*—Stephen Avila
*Attorney, Agent, or Firm*—Flynn, Thiel, Boutell & Tanis, P.C.

[57] ABSTRACT

A electric motor, which drives a fluid pressure pump used to derive a steering assist force, is controlled in a required manner using a simplified arrangement. Specifically, a pump 11 which feeds a fluid pressure in order to produce an assist force is driven by a D.C. brushless motor 11 which is provided with means 18 for detecting a rotational position of a rotor 23 thereof. Motor control means 14, 15 drives and controls the motor to rotate at a given number of revolutions. Vehicle speed detecting means 16 detects a running speed of a vehicle. The motor control means controls the number of revolutions of the brushless motor on the basis of information representing a vehicle speed, a number of revolutions of the rotor which is determined by utilizing a signal from the rotor position detecting means, and information from means which detect a steer angle and a steering angular rate.

8 Claims, 8 Drawing Sheets

5,711,394

POWER STEERING APPARATUS WITH MOTOR DRIVEN PUMP

BACKGROUND OF THE INVENTION AND RELATED ART STATEMENT (a) Field of the Invention The invention relates to a power steering apparatus which obtains a steering assist force (or simply assist force) by feeding a fluid pressure to a power cylinder in according with a steering operation of a steering wheel, and more particularly, to a power steering apparatus with motor driven pump in which a fluid pressure pump, serving as a source of fluid pressure, is driven by a D.C. brushless motor.

(b) Description of the Related Art

A variety of power steering apparatus with motor driven pump in which an oil pressure pump is driven by an electric motor so that an assist force of a required magnitude be obtained in response to an oil pressure which depends on a running condition of a vehicle, such as a vehicle speed are disclosed as exemplified in Japanese Laid-Open Utility Model Application No. 67,391/81. In a conventional arrangement, the electric motor used is generally a D.C. motor with brushes. In the motor with brushes, an electrical connection with a rotor is made by utilizing a sliding contact of brushes with a commutator on a motor shaft. A rotative driving force in a required direction and at a given number of revolutions is obtained by switching the direction of current flow passed through an armature winding of the motor through the connection established by the sliding contact of the brushes.

However, a motor with brushes as mentioned experiences an abrasion of brushes which are disposed in sliding contact with the commutator, and accordingly requires a periodic maintenance, which is indispensable to maintain the useful life of and to prevent acoustical noises produced by a brush assembly comprising brushes and the commutator. This presents a serious problem in particular for a motor driven pump which is often driven at a high load and operated at a high speed. For example, a frequent maintenance must be performed each time the cumulative distance run by an automobile reaches a given value in order to replace the brushes by fresh ones.

In addition, such a motor with brushes is susceptible to the likelihood that a contact between the brushes and the commutator may be interrupted as an accidental fault to cease the rotation of the motor. Once an abrasion occurs in the brushes, powder produced by the abrasion of the brushes finds its way into slots of the commutator causing a short-circuit, resulting in a reduction in the motor output.

Furthermore, a motor with brushes cannot accommodate for an increased voltage due to the motor characteristic. For example, if it is attempted to utilize a higher voltage of 100 V D.C. or higher, an inconvenience results that the abrasion of the brushes becomes severe.

OBJECT AND SUMMARY OF THE INVENTION

Accordingly, it is an object of the invention to provide a power steering apparatus with motor driven pump in which a pump, serving as a source of fluid pressure to derive a steering assist force, is driven by a D.C. brushless motor so that the need for the maintenance of the motor be eliminated while simplifying a drive control of the motor in an appropriate manner by utilizing a minimum amount of detective means and control means.

Above object is accomplished by using a D.C. brushless motor, which is provided with means for detecting a rotational position of the rotor, for driving a fluid pressure pump which feeds a fluid pressure to a power cylinder in order to generate a steering assist force, and by providing motor control means which controls the rotation of the brushless motor at a given number of revolutions, and vehicle speed detecting means which detects the running speed of a vehicle as vehicle speed information. By utilizing the vehicle speed information from the vehicle speed detecting means and a detection signal from the rotor position detecting means of the brushless motor, information representing the number of revolutions of the motor can be obtained and is used to control the number of revolutions of the brushless motor by means of the motor control means.

Additionally, steering angle detecting means may be provided for detecting a steer angle and a steering angular rate which result from a steering operation. Such information from the steering angle detecting means is used together with the vehicle speed information from the vehicle speed detecting means and information representing the number of revolutions of the motor which is derived by the rotor position detecting means to control the number of revolutions of the D.C. brushless motor by means of the motor control means.

Thus, in accordance with the invention, when driving a fluid pressure pump, which serves as a source of assist force for the power steering apparatus, with a D.C. brushless motor, a rotor position detecting sensor which is provided within the brushless motor itself is utilized. A detection signal from the sensor will be used to derive a number of revolutions of the rotor, which is compared against a target number of revolutions which is determined in accordance with a vehicle speed either alone or a combination of vehicle speed, a steer angle and a steering angular rate, thus controlling the motor so that the number of revolutions of the motor becomes equal to the target number of revolutions.

DETAILED DESCRIPTION OF THE PREFERRED EMBODIMENTS

Figure 1:
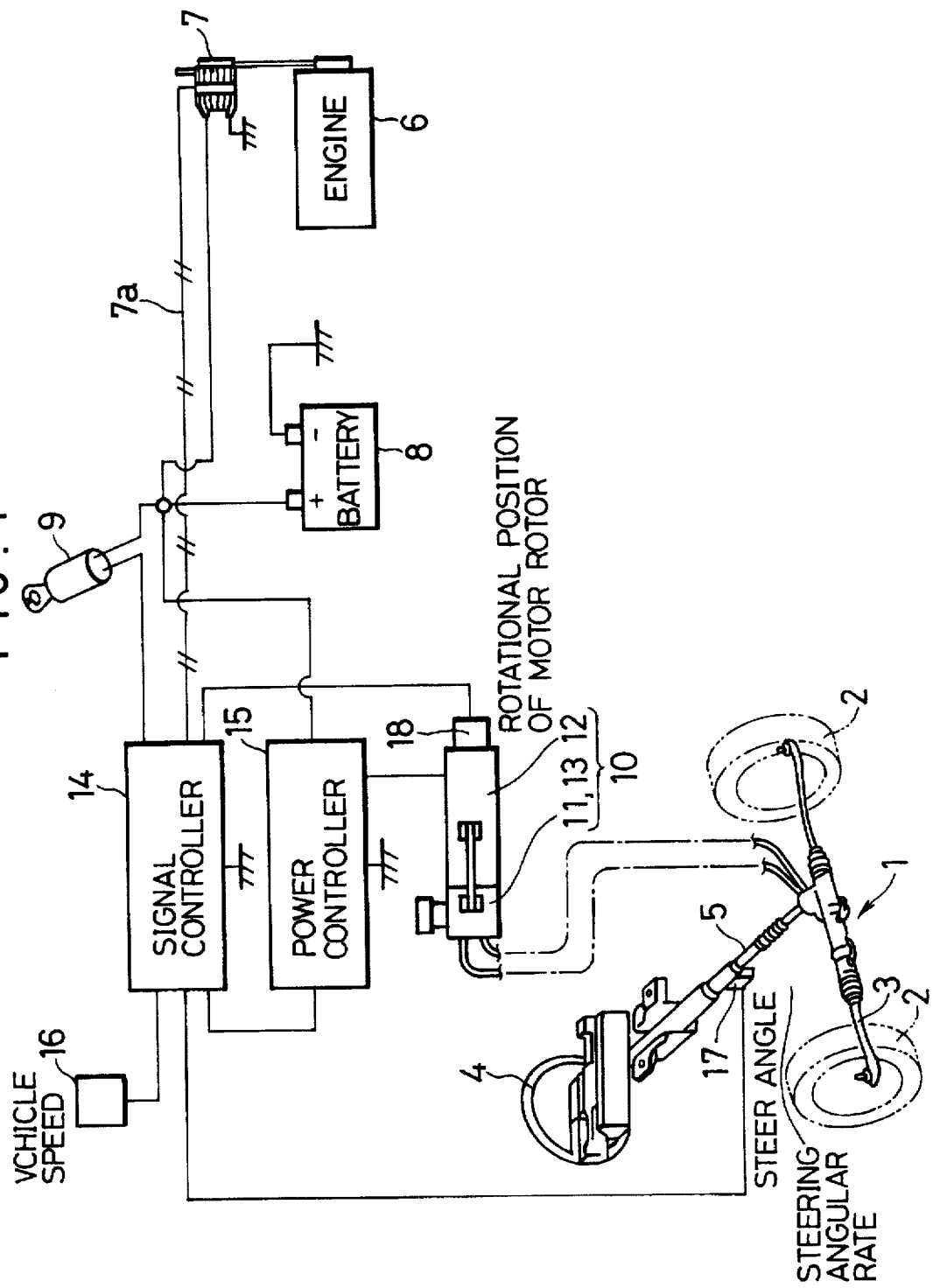
FIG. 1 is a schematic view illustrating the general arrangement of a power steering apparatus with motor driven pump according to one embodiment of the invention.

Referring to FIG. 1, a hydraulic power steering apparatus includes a drive unit 1, including a tie rod 3 which is connected left and right steerable wheels 2 of an automobile, not shown, through knuckle arms. While not shown in detail, the drive unit 1 includes a flow path switching valve which switches an oil pressure flow path in response to a steering operation of a steering wheel 4 which is transmitted through a steering shaft 5, a transmission which transmits the steering operation to the tie rod 3, and a power cylinder including a left and a right chamber into which an oil pressure may be introduced to generate an assist force in accordance with the steering operation, as is known in the art.

Figure 2:
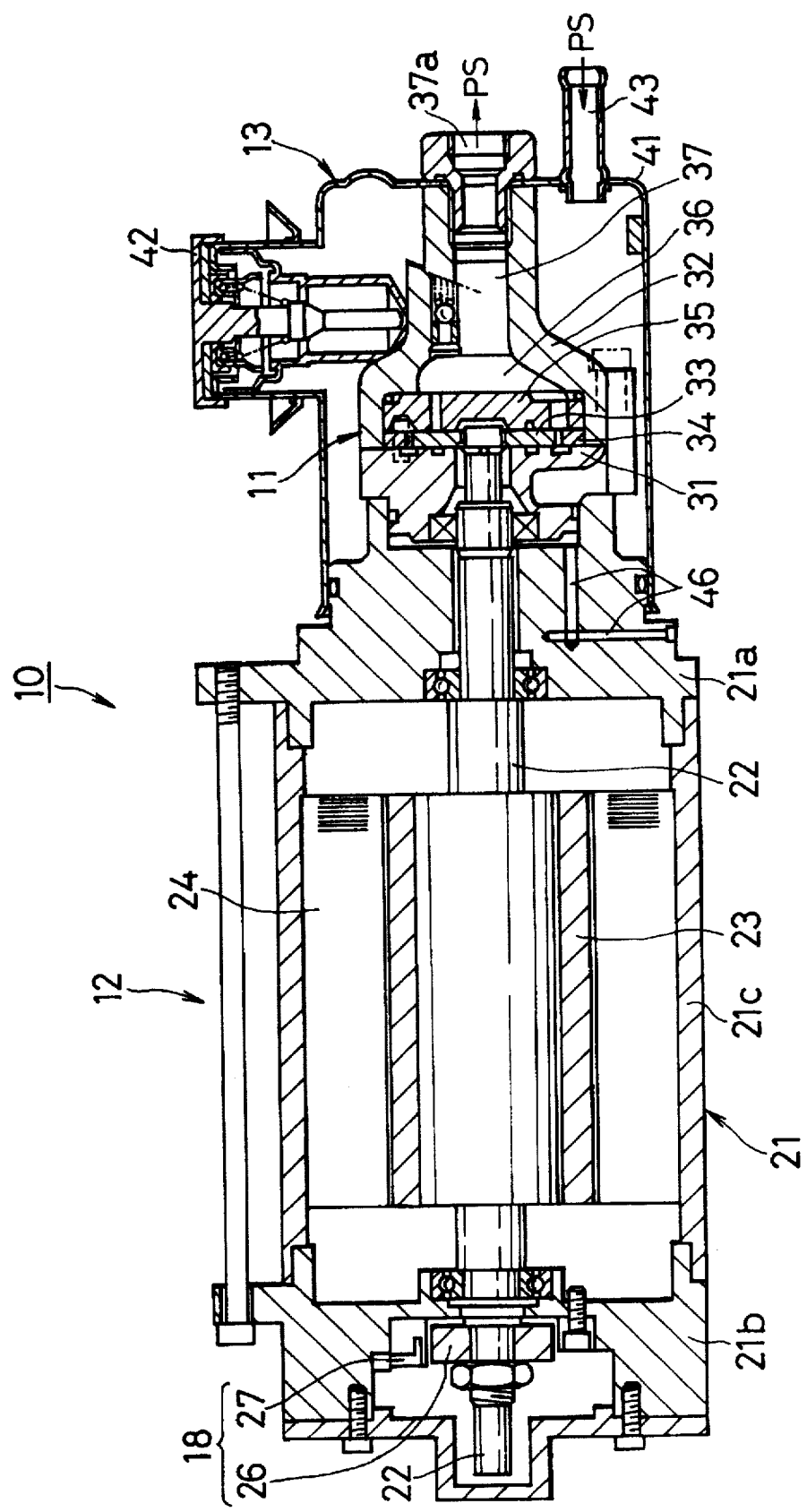
FIG. 2 is a cross section of an oil pump assembly including a D.C. brushless motor used in the steering apparatus which is integrated with an oil pump driven by the motor.

As shown, the apparatus includes an engine 6 mounted on an automobile, which drives an alternator 7, which is excited by an onboard battery 8. An oil pump assembly 10 is driven by an electric motor to feed a pressure well to the drive unit 1. Referring to FIG. 2, the oil pump assembly 10 comprises an oil pump 11 of vane type, a D.C. brushless motor 12 which drives the pump 11, and an oil tank 13 defined by a casing 41 which surrounds the pump 11.

As shown in FIG. 1, in order to drive and control the brushless motor 12, there are provided a signal controller 14 which is connected to the alternator 7 and the onboard battery 8 through an ignition switch 9, and a power controller 15 which supplies a drive current to the motor 12 through the signal controller 14. The power controller 15 is also connected to the alternator 7 and the battery 8 and is energized by a signal from the signal controller 14 when the switch 9 is turned on. It is to be understood that an operation confirm signal associated with the engine 6 is transmitted to the signal controller 14 through a line 7a.

With continued reference to FIG. 1, a vehicle speed sensor 16 detects a vehicle speed, a steering angle sensor 17 detects a steer angle and a steering angular rate which result from a steering operation, and a rotational position detecting sensor 18 detects a rotational position of the rotor in the brushless motor 12. Detection signals from these sensors are fed to the signal controller 14.

In the described arrangement, in response to detection signals from the vehicle speed sensor 16, steering angle sensor 17 and rotational position detecting sensor 18, an on signal from the ignition switch 9 and the operation confirm signal for the engine 6, the signal controller 14 and the power controller 15 are enabled to drive the brushless motor for rotation. The pump 12 is then operated under a required condition to feed a pressure oil having a required pressure to the power cylinder through the flow path switching valve in the drive unit 1. In this manner, the magnitude of the assist force when the steering wheel 4 is being operated is controlled so that the magnitude of the assist force is increased to provide a light sensation of steering when the steering operation takes place in the low speed running region of the automobile while the magnitude of the assist force is decreased to provide a heavy sensation of steering when steering in the medium and high speed region. Referring to FIG. 2, the general construction of the oil pump assembly 10 will be described below. The brushless motor 12 comprises a motor shaft 22 which is rotatably supported in the opposite end bodies 21a, 21b of a housing 21, a rotor 23 mounted on the motor shaft 22 at the axial center thereof and carrying magnets of opposite polarities alternately disposed around its circumference, and a stator 24 disposed on the inner wall of a cylindrical portion 21c of the housing 21 so as to surround the rotor 23 and including a coil disposed around a core.

As shown in FIG. 2, the rotational position detecting sensor 18 for the rotor 23 is disposed between a portion of the motor shaft 22 which projects externally and the left end body 21b so as to detect the rotational position of the motor shaft 22, and comprises a switch magnet 26 mounted on the motor shaft 22, and a Hall IC rotation sensor 27 mounted on part of the body 21b in surrounding relationship with the magnet 26. In this manner, the rotational position of the motor shaft 22, and hence of the rotor 23 which is mounted on the shaft is detected so that a switching on signal applied to the coil of the stator 24 be controlled to be coincident precisely in timing with such position information in order to enable the rotor 23 to be driven.

The oil pump 11 includes a pair of pump bodies 31, 32 which are mounted on the other end of the motor shaft 22 coaxially and in juxtaposition to each other, and which define an internal space in which pump components, including a cam ring 34 receiving therein a rotor 33 mounted on the motor shaft 22 and having vanes and a pressure plate 35 disposed in abutment against one side thereof, are disposed. The pump 11 includes a pump discharge chamber 36 leading to a discharge passage 37 connected to a pump discharge port 37a which projects externally of the oil tank 13.

The oil tank 13 comprises a casing 41 associated with a right end of the motor so as to cover the pump 11, a cap 42 with an oil guage which blocks an oil feed port opening in the top of the casing 41, and a return port 43 which returns a returned oil from the drive unit 1 of the power steering apparatus to the bottom of the casing 41. It will be noted that an air vent passage 46 is formed in the body 21a of the brushless motor 12 and opens toward the oil pump for venting the air from within the motor 12.

Figure 3:
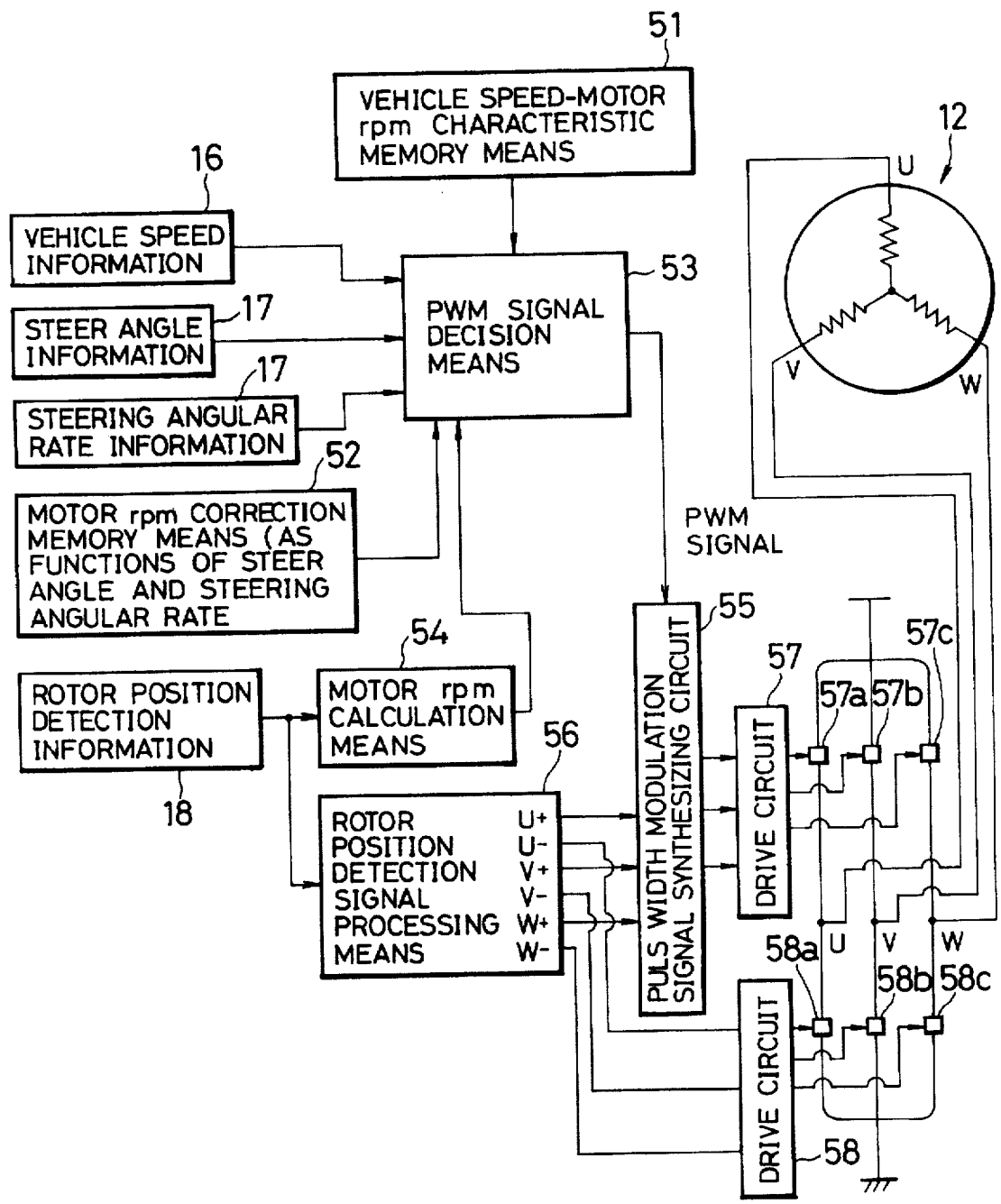
FIG. 3 is a control block diagram when a D.C. brushless motor, which drives a pump, is driven by a full wave rectification.

FIG. 3 is a control block diagram of a control arrangement which controls the supply current from the onboard battery 8 (FIG. 1) to the D.C. brushless motor 12 of the described power steering apparatus. In the present embodiment, the supply current from the onboard battery 8 to the motor 12 is controlled on the basis of a vehicle speed signal from the vehicle speed sensor 16, signal information from memory means 51 having a vehicle speed-motor rpm characteristic map, a steer angle and a steering angular rate signal for the steering wheel 4 which are supplied from the steering angle sensor 17, and signal information from memory means 52 having a motor rpm correction map as a function of the steer angle and the steering angular rate.

A detection signal from the sensor 18 is utilized which detects the rotational position of the rotor 13 and which is provided within the brushless motor 12 itself, that is used to drive the oil pump 11, serving as a source of assisting force for the power steering apparatus described above. The number of the revolutions of the rotor 23 which can be derived from the detection signal is compared against a target number of revolutions which is determined in accordance with the vehicle speed, the steer angle and the steering angular rate, and the drive of the motor 12 is controlled to achieve a desired motor rpm (which eventually corresponds to the discharge flow rate of the pump 11). As is well known in the art, the rotational position sensor 18 is necessary to provide an accurate timing adjustment between the switching signal and the position information when driving the brushless motor 12 in the manner mentioned above.

Referring to FIG. 3, PWM signal decision means 53 constitutes motor control means, and receives information representing the vehicle speed, the steer angle and the steering angular rate mentioned above as well as information from the memory means 51 having the vehicle speed-motor rpm characteristic map, the memory means 52 having the motor rpm correction map and motor rpm calculation means 54 which responds rotor position detection information supplied from the rotational position sensor 18 associated with the rotor 23 for modulating the width of pulses which are used to energize the motor 12. PWM signal from the decision means 53 is fed to a pulse width modulation signal synthesizing circuit 55.

It is to be noted that the PWM signal mentioned above may be stored in ROM contained in the signal controller 14 in the form of a map in which a desired PWM signal can be selected on the basis of sensor signals or may be stored in the form of a calculation formula.

With continued reference to FIG. 3, rotor position detection signal processing means 56 receives a signal from the rotational position sensor 18 and has U+, V+ and W+ terminals which are connected through the pulse width modulation signal synthesizing circuit 55 to a first drive circuit 57, which is in turn connected to three power transistors 57a, 57b, 57c for driving the motor 12. The processing means 56 also has U−, V− and W− terminals, which are connected through a second drive circuit 58 to three power transistors 58a, 58b, 58c. The junctions between each one of the power transistors 57a, 57b and 57c, and a corresponding one of the power transistors 58a, 58b, 58c are connected to U, V and W terminals of the motor 12 to supply an energizing current for driving the motor 12 to rotate at a desired number of revolutions.

Figure 4:
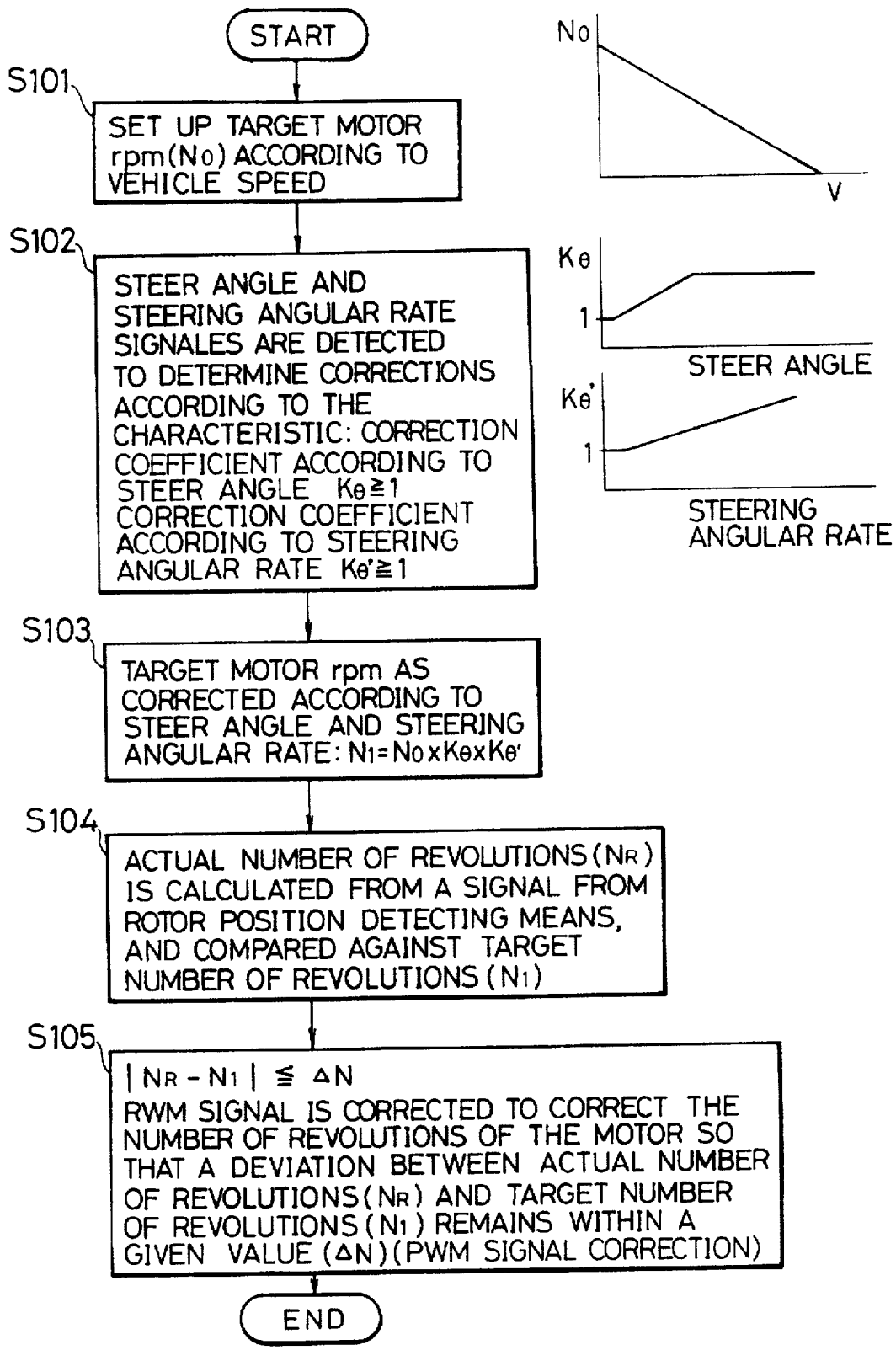
FIG. 4 is a flow chart of a drive control of the D.C. brushless motor.

FIG. 4 is a flow chart of a control over the number of revolutions of the motor which takes place in the control block diagram shown in FIG. 3. At step 101 (hereafter abbreviated as "S101"), a target number of revolutions (No) of the motor 12 which corresponds to a vehicle speed supplied from the vehicle speed sensor 16 is set up in accordance with the map stored in the memory means 51. As graphically shown in FIG. 4, the target rpm (No) of the motor 12 depicts a characteristic which is inversely proportional to the vehicle speed V.

At S102, signals representing a steer angle and a steering angular rate which are obtained from the steering angle sensor 17 are detected, and a correction to the characteristic obtained at S101 is determined in accordance with the map stored in the memory means 52 as a function of the steer angle and the steering angular rate. It is to be noted that a correction coefficient Kθ according to the steer angle and a correction coefficient Kθ' according to the steering angular rate depict respective characteristics graphically shown in FIG. 4 in a manner such as that Kθ≧1, Kθ'≧1.

At S103, corrections to the target number of revolutions of the motor 12 which are obtained at S102 according to the steer angle and the steering angular rate are used to determine N1=No×Kθ×Kθ'.

At S104, an actual number of revolutions (NR) of the motor 12 is calculated from a signal obtained from the rotor position detecting means (or rotor rotational position sensor 18) which is provided within the motor 12, and is compared against the corrected target number of revolutions (N1) as obtained at S103.

At S105, the PWM signal is corrected so that the deviation between the actual number of revolutions (NR) and the target number of revolutions (N1) of the motor 12 is equal to or less than a given value (ΔN) or |NR−N1|<ΔN, thus correcting the number of revolution of the motor in accordance with a varying running condition.

To recapitulate, in accordance to the invention, D.C. brushless motor 12 is used to drive the pump, and a detection signal representing the rotational position of the rotor which is available from the motor is utilized to calculate the actual number of revolutions of the rotor 23 or the motor 12. A relation between the vehicle speed, the steer angle or the steering angular rate on one hand and the target number of revolutions of the motor on the other is prepared as a map, and a deviation between the actual number of revolutions (NR) and the target number of revolutions (N1) of the rotor 23 is calculated to preform a PWM control over the number of revolutions of the motor so that the deviation is maintained below a given value, which is 0 ideally.

Figure 5:
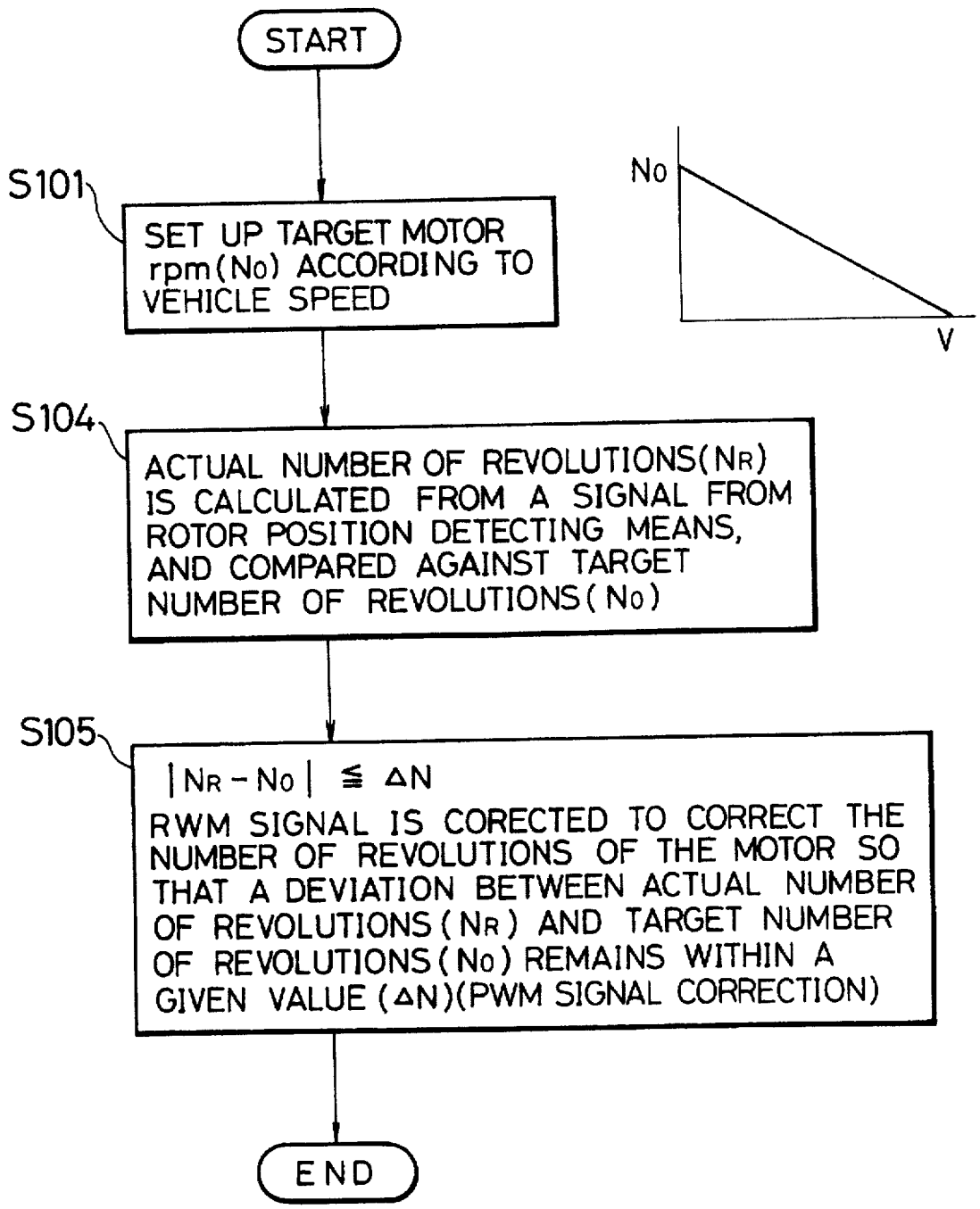
FIG. 5 is a flow chart of a modification of FIG. 4.

In the power steering apparatus with motor driven pump according to the described embodiment, the vehicle speed from the vehicle speed sensor 16, a characteristic value obtained from the memory means 51 which stores the vehicle speed-motor rpm characteristic map, steer angle and steering angular rate from the steering angle sensor 17, and a correction to the number of revolutions of the motor which is obtained from the memory means 52 as the function of the steer angle and the steering angular rate are fed to the PWM signal decision means 53 in order to determine the PWM signal, as a prerequisite to controlling the assist force when operating the steering wheel 4. However, the invention is not limited to such arrangement, but the drive control of the pump by the motor may be performed by determining the PWM signal as a function of the vehicle speed alone. In such instance, the use of information representing the steer angle and the steering angular rate which are available from the steering angle sensor 17 shown in FIG. 3 as well as the memory means 52 which stores a correction to the number of revolutions of the motor as a function of the steer angle and the steering angular rate may be eliminated. Also, when controlling the number of revolutions of the motor 12 in dependence on the vehicle speed alone, the resulting flow chart will be as shown in FIG. 5, comprising only steps S101, S104 and S105. In this instance, the target number of revolutions of the motor 12 will be No.

Figure 6:
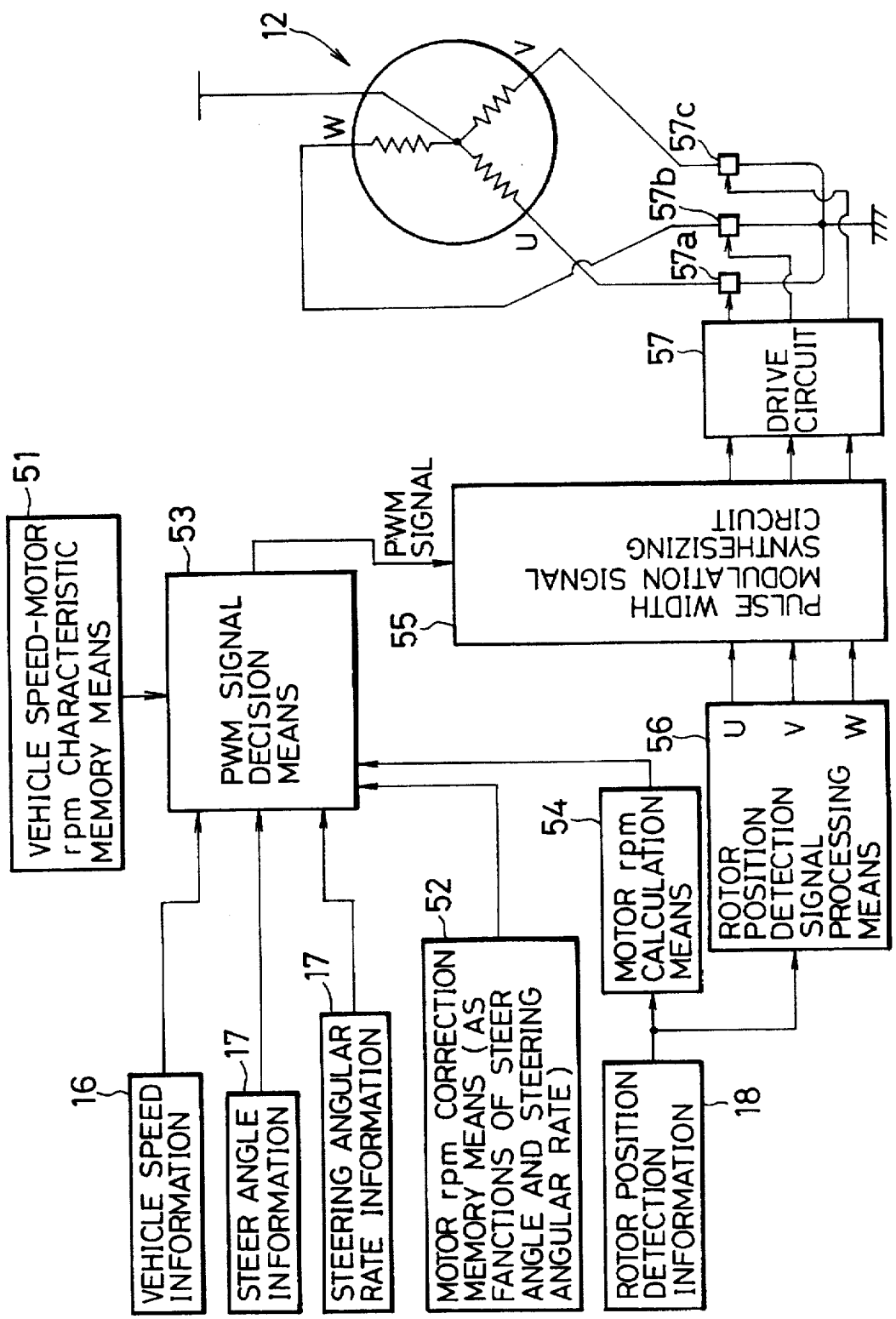
FIG. 6 is a control block diagram when the full wave rectification shown in FIG. 3 is replaces by the halve wave rectification.

FIG. 6 is a control block diagram when the motor drive by the full wave rectification shown in FIG. 3 is replaced by the motor drive by the halve wave rectification. The control block diagram operates essentially in the same manner as mentioned previously except that a +side pulse signal is used to drive the motor 12 rather than utilizing all the signals from the rotational position detecting sensor 18 associated with the rotor 23. Thus, it is possible to drive the motor 12 using a single drive circuit 57 and power transistors 57a, 57b and 57c connected thereto. As compared with a full wave rectification, the number of power transistors required can be reduced from six to three, thus allowing a reduction in the cost involved.

Figure 7:
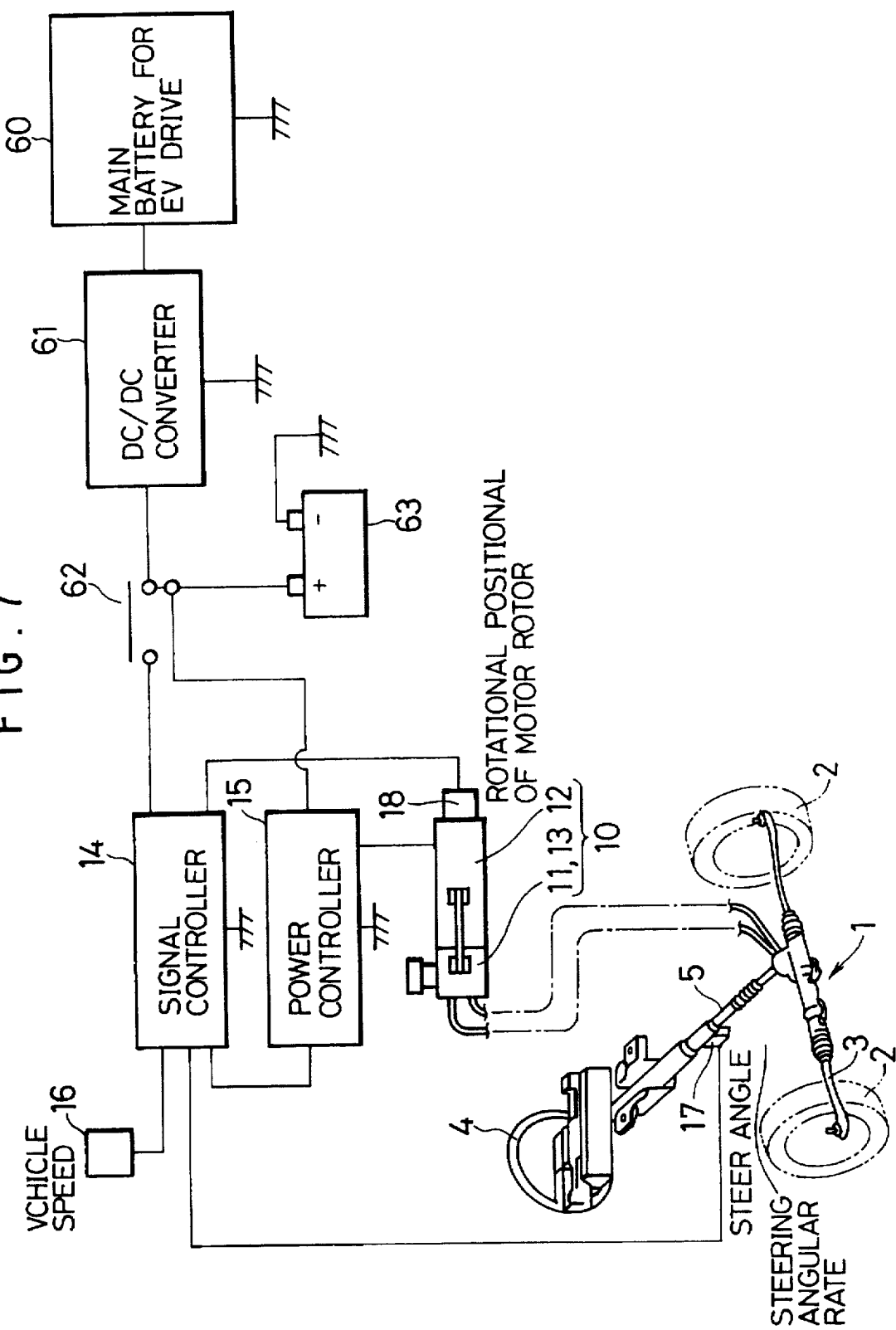
FIG. 7 is a schematic view of a power steering apparatus with motor driven pump according to another embodiment of the invention, which is a modification of the arrangement shown in FIG. 1.

FIG. 7 shows schematically the use of the power steering apparatus with motor driven pump according to the invention in a vehicle of which a high voltage source (EV) supplying a high voltage on the order of 300 to 400 V, for example, is mounted as an onboard main battery. In the example shown, a main battery 60 is connected to a DC-DC converter 61, which converts the high voltage to 12 V, which is fed to the signal controller 14 when a operation switch 62 is turned on. An auxiliary battery 63 supplies a low voltage of 12 V or the like, and is connected to one contact of the switch 62 and also connected to the power controller 15. As before, this embodiment achieves a similar drive control at the desired number of revolutions of the pump as mentioned previously.

Figure 8:
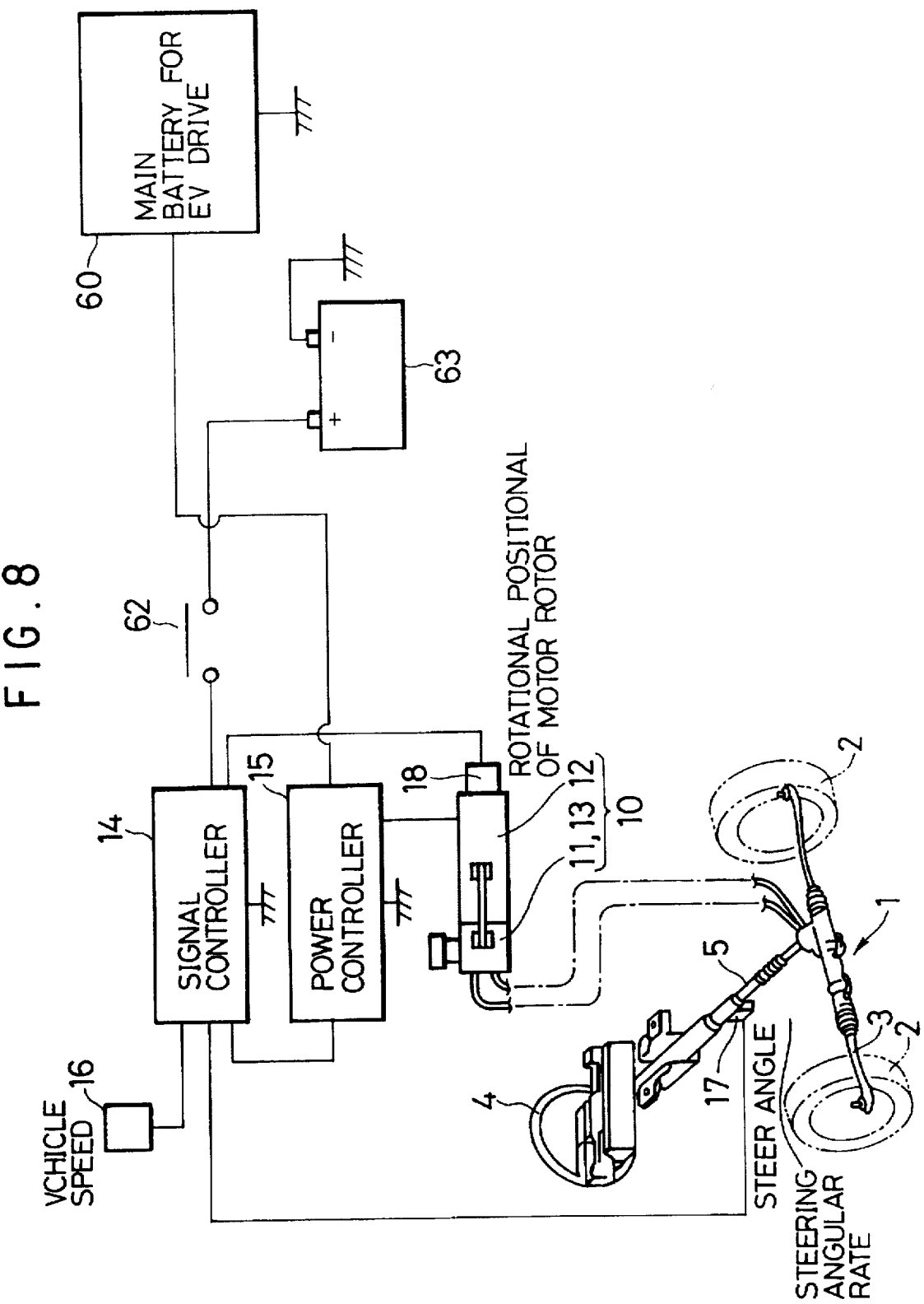
FIG. 8 is a schematic view of the overall arrangement including the modification shown in FIG. 7.

FIG. 8 shows a modification of FIG. 7 where the main battery 60 is directly connected to the power controller 15, and an operation switch 62 is connected between the auxiliary battery 63 and the signal controller 14 which controls the energization of the motor 12 by the power controller 15. By operating the switch 62, the motor 12 may be driven to produce the assist force from the power steering apparatus.

With this arrangement, a similar functioning and effect are achieved which are comparable to the previous embodiment. In addition, since the motor can be driven from a high voltage, the efficiency will be improved as compared with the use of a voltage conversion by the DC-DC converter, thus reducing the power dissipation.

It should be noted that the invention is not limited to the precise arrangement of the described embodiments, but that a number of changes, substitutions and modifications can be made in the configuration and construction of various parts. For example, while in the described embodiment, the rotational position of the rotor 23 of the D.C. brushless motor 12 is detected by the sensor 18, which comprises Hall IC, the invention is not limited thereto, but may utilize an encoder instead.

Also, while the oil pressure pump 11 of vane type is illustrated as a fluid pressure pump in the described embodiment, the invention is not limited thereto, but various pump constructions may be used including a gear pump, a piston pump or the like, the only requirement being that the pump can be driven by the rotation of the motor.

As described, in the power steering apparatus with motor driven pump according to the invention, the motor which is used to drive the fluid pressure pump, serving as a source of generating the steering assist force, comprises a D.C. brushless motor which is provided with means for detecting the rotational position of the rotor. A control over the number of revolutions of the brushless motor which takes place by the motor control means is based on vehicle speed information available for the vehicle speed detecting means and information representing the number of revolutions of the rotor which is derived by utilizing a detection signal from the rotor position detecting means. In this manner, there is provided a simple arrangement which nevertheless provides excellent effects that since the brushless motor is used in driving the pump, there is no abrasion or failure which is attributable to the abrasion, thus enhancing the operational reliability. In addition, there is no problem of acoustic noises which are produced by a movement of the brushless as experienced in the conventional motor with brushes, while a smooth rotor rotation is assured within the motor, thus enabling an efficient pump drive. Since there is no likelihood of occurrence of sparks at the brushes in the brushless motor, the arrangement of the invention is the optimum for use with a high voltage source.

In accordance with the invention, the number of revolutions of the motor can be controlled independently from the presence or absence of a load. In addition, since the control is simplified by utilizing a result of detection by the rotation detecting means for the rotor which is provided within the brushless motor itself, the apparatus is simplified by omitting separate detecting means, thus allowing a reduction in the manufacturing cost. The use of the brushless motor removes the need for the maintenance of the motor assembly.

In the power steering apparatus with motor driven pump according to the invention, the control of the number of revolutions of the brushless motor which takes place by the motor control means is based on the vehicle speed information available from the vehicle speed detecting means, the number of revolutions information of the motor which can be derived by utilizing a signal from the rotor position detecting means as well as maps which are previously prepared on the basis on the information from means which detect the steer angle and the steering angular rate. In this manner, a steering control over a more extensive range of vehicle running conditions is possible.

What is claimed is:

1. A power steering apparatus with motor driven pump in which a fluid pressure pump is driven by a motor to feed a fluid pressure to a power cylinder in accordance with a steering operation, thereby producing a steering assist force;

characterizing in that the motor which drives the fluid pressure pump comprises a D.C. brushless motor which is provided with means for detecting the rotational position of a rotor thereof, further including motor control means for controlling the brushless motor so as to rotate at a given number of revolutions, and vehicle speed detecting means for detecting the running speed of a vehicle, a control over the number of revolutions of the brushless motor which takes place by the motor control means being based on the vehicle speed available from the vehicle speed detecting means and information representing the number of revolutions of the motor which is derived from a detection signal from the rotational position detecting means within the brushless motor.

2. A power steering apparatus according to claim 1 in which a target number of revolutions of the motor is established in accordance with a vehicle speed available from the vehicle speed detecting means, and is compared against an actual number of revolutions of motor which is determined from a detection signal from the rotor position detecting means, the number of revolutions of the motor being controlled so that a deviation between the target and the actual number of revolutions is equal to or less than a given value.

3. A power steering apparatus according to claim 1, further including steering angle detecting means which detects a steer angle and a steering angular rate when a steering operation occurs, a control over the number of revolution of the brushless motor which takes place by the motor control means is based on a vehicle speed available from the vehicle speed detection means, and information representing a number of revolutions of the motor which is determined from a signal supplied from the rotor position detecting means as well as information detected by the steering angle detecting means.

4. A power steering apparatus according to claim 3 in which a target number of revolutions of the motor is established in accordance with a vehicle speed supplied from the vehicle speed detecting means, and is then corrected in accordance with a steer angle and a steering angular rate supplied from the steering angle detecting means, the corrected target number of revolutions being compared against an actual number of revolutions of motor which is determined from a detection signal supplied from the rotor position detecting means, a control over the number of revolutions of the motor being effected so that a deviation between the corrected target and the actual number of revolutions is equal to or less than a given value.

5. A power steering apparatus according to claim 1 in which the brushless motor is driven by a full wave rectification.

6. A power steering apparatus according to claim 1 in which the brushless motor is driven by a halve wave rectification.

7. A power steering apparatus according to claim 1 in which a main battery of a high voltage is connected to the motor control means to drive and control the motor.

8. A power steering apparatus according to claim 7 in which a voltage fed from the main battery is converted by a DC-DC convertor before it is supplied to the motor control means.

* * * * *